(12) United States Patent
Matsuo et al.

(10) Patent No.: US 8,198,392 B2
(45) Date of Patent: Jun. 12, 2012

(54) POLYMER PRODUCING METHOD AND APPARATUS AND POLYMER DEGASSING METHOD AND APPARATUS

(75) Inventors: Toshiaki Matsuo, Hitachi (JP); Masayuki Kamikawa, Hitachi (JP); Kenichiro Oka, Hitachi (JP); Naruyasu Okamoto, Tokyo (JP); Ryuji Kajiya, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 862 days.

(21) Appl. No.: 12/259,432

(22) Filed: Oct. 28, 2008

(65) Prior Publication Data

US 2009/0111954 A1 Apr. 30, 2009

(30) Foreign Application Priority Data

Oct. 29, 2007 (JP) .................................. 2007-280121
Mar. 18, 2008 (JP) .................................. 2008-069666

(51) Int. Cl.
*C08G 63/08* (2006.01)
*B01J 19/18* (2006.01)
*B01F 7/32* (2006.01)
*B01D 1/00* (2006.01)

(52) U.S. Cl. .......... 528/359; 528/354; 528/501; 526/65; 422/134; 366/139; 366/248; 159/25.1

(58) Field of Classification Search .................. 528/359, 528/501, 354; 526/65; 422/134; 366/139, 366/248; 159/25.1
See application file for complete search history.

(56) References Cited

U.S. PATENT DOCUMENTS

| | | | |
|---|---|---|---|
| 3,440,019 A * | 4/1969 | Albrecht et al. | 422/134 |
| 3,761,059 A * | 9/1973 | Rothert et al. | 366/316 |
| 4,776,703 A | 10/1988 | Oda et al. | |
| 5,770,682 A * | 6/1998 | Ohara et al. | 528/354 |
| 2003/0227816 A1 | 12/2003 | Okamoto et al. | |
| 2005/0169817 A1* | 8/2005 | Matsuo et al. | 422/135 |

FOREIGN PATENT DOCUMENTS

| | | |
|---|---|---|
| GB | 1 097 347 | 1/1968 |
| JP | 2523770 | 5/1996 |
| JP | 10-218998 | 8/1998 |
| JP | 3419609 | 4/2003 |
| JP | 2004-10791 | 1/2004 |
| JP | 2005-220203 | 8/2005 |
| JP | 2007-126601 | 5/2007 |

OTHER PUBLICATIONS

Amborski, et al, Physical Properties of Polyethylene Terephthalate Films, Ind. and Eng. Chemistry, 45(10), 1953.*

* cited by examiner

*Primary Examiner* — Fred M Teskin
(74) *Attorney, Agent, or Firm* — Mattingly & Malur, P.C.

(57) ABSTRACT

The polymer degassing apparatus includes a barrel-shaped horizontal container 41 having a supply port 42 for supplying a reactant, a discharge port 43 for discharging a reactant, a stirring means 45 for stirring a reactant, and a degassing means for drawing a gas via a degassing port 44 of the horizontal container. The supply port is positioned below the molten liquid level of the reactant. A recovery container 37 that is connected to the degassing port for recovering a volatile substance in the gas and a vacuum pump 36 are provided. The stirring means includes a plurality of stirring rods 46 oriented along the same direction as the axis in the horizontal container and coupling members 47 for coupling the stirring rods along the same direction as the axis, provided that the coupling members are placed at a distance from the virtual rotation center of the stirring means.

8 Claims, 2 Drawing Sheets

POLYMER PRODUCING METHOD AND APPARATUS AND POLYMER DEGASSING METHOD AND APPARATUS

BACKGROUND OF THE INVENTION

1. Field of the Invention

The present invention relates to a polymer producing method, a polymer producing apparatus, a polymer degassing method, and a polymer degassing apparatus. The present invention particularly relates to a technique for removing unreacted monomers and the like from a ring-opening polymerized polymer such as polylactide.

2. Background Art

Polylactide, which is a polymer synthesized by a ring-opening polymerization reaction, is a colorless and transparent polyester prepared using, as a raw material, lactic acid, which is a hydroxycarboxylic acid. A known method for synthesizing polylactide from lactic acid is a method wherein lactic acid is condensed to produce an oligomer, a catalyst such as antimony oxide is added to the oligomer to carry out thermal cracking to produce lactide (cyclic dimer of lactic acid), and a catalyst such as tin octylate is added to the lactide to carry out ring-opening polymerization.

For instance, a widely known method for polymerizing polylactide is a continuous method in which reaction tanks for ring-opening polymerization of lactide are connected in series, and a raw material, i.e., molten lactide, is supplied and a polymerized product is discharged at the same time. In such a case, operations are carried out by adequately controlling the temperature, the amount of catalyst, and the residence time, which may be varied for each reaction tank. Thus, it is possible to inhibit yellowing as a result of thermal decomposition of polylactide due to prolonged temperature history and accumulation of reaction heat associated with polymerization.

As an aside, polylactide which has been produced in the above manner contains unreacted lactide in large amounts. Thus, it is fragile in terms of strength and tends to be hydrolyzed, which is problematic. Therefore, an apparatus for use in removing unreacted lactide in a vacuum pressure environment from polylactide obtained as a final polymerized product (demonomerization) has been disclosed (see JP Patent No. 3419609). In the case of the apparatus disclosed in JP Patent No. 3419609, a stirrer having a rotation shaft to which a plurality of stirring blades have been attached in parallel at a certain interval is accommodated in a horizontal container, and the container has a port for supplying a polymerized reactant (polymer), a port for discharging the same, and a degassing port for degassing a gas. The reactant supplied to the container is transferred within the container as the stirring blades rotate and the reactant is removed therefrom in a state in which an unreacted monomer is degassed in a vacuum atmosphere.

In addition, JP Patent Publication (Kokai) No. 10-218998 A (1998) discloses an invention concerning a technique for obtaining polycondensed polyester in which a stirring body is formed by alternately orienting a plurality of blade plates and doughnut-shaped circular plates longitudinally with respect to a container. The stirring body is allowed to rotate circumferentially within the container in order to promote a polymerization reaction, and a by-product is removed by degassing. According to this technique, stirring is carried out on a face oriented substantially orthogonally with respect to the flow of a reaction solution in the longitudinal direction of the container (vertical face) and no stirring shaft exists at the virtual rotation center, such that polymer deposition on a rotation shaft can be inhibited.

Likewise, JP Patent Publication (Kokai) No. 2004-10791 A discloses an invention concerning a stirrer in which two rotation blade bodies, each having no stirring shaft inserted through the virtual rotation center, are arranged in parallel in a container and they are allowed to rotate in opposite directions. According to this apparatus, stirring is carried out with a spectacle-shaped stirring blade on a face oriented substantially orthogonally with respect to the flow of a reaction solution flowing longitudinally in the container and no stirring shaft inserted through the virtual rotation center exists, such that polymer deposition on a rotation shaft can be inhibited.

Further, JP Patent No. 2523770 discloses an invention concerning a technique for obtaining polycondensed polyester in which stirring blades formed by coupling rectangular stick frames oriented longitudinally with respect to a tank are arranged in parallel in a container and they are allowed to rotate in the container. According to this technique, stirring is carried out along with rotation of rectangular frames that do not have faces oriented substantially orthogonally with respect to the flow of a reaction solution flowing longitudinally in the container, such that polymer deposition on a rotation shaft inserted through the virtual rotation center or on the stirring blade surface can be inhibited.

Meanwhile, JP Patent Publication (Kokai) No. 2005-220203 A discloses a technique comprising a continuous ring-opening polymerization step for obtaining mainly polylactide, in which at least two reaction tanks are connected in series, provided that a horizontal polymerization tank is placed in the fore stage and a vertical polymerization tank is placed in the rear stage, and a residual monomer is removed following the ring-opening polymerization reaction. According to this technique, a reaction solution has plug-flow characteristics and a high capacity to remove reaction heat in the ring-opening polymerization step. Thus, polymerization can proceed to achieve high reactivity with less thermal degradation. Accordingly, a high-quality polymer can be synthesized.

Furthermore, JP Patent Publication (Kokai) No. 2007-126601 A discloses a technique for mixing an additive with a reaction solution between a continuous ring-opening polymerization step for obtaining mainly polylactide and the subsequent step of removing a residual monomer. According to this technique, a depolymerization reaction is inhibited in the step of removing the residual monomer and thus a substantially degradation-free and high-quality polymer can be synthesized.

SUMMARY OF THE INVENTION

However, a reactant to be supplied to the apparatus of JP Patent No. 3419609 is a polymer in a completely polymerized state, and thus it originally has high liquid viscosity. Further, the liquid viscosity increases as demonomerization proceeds. Therefore, when the apparatus of JP Patent No. 3419609 is used to treat a reactant, a highly viscous reactant might be deposited on a rotation shaft of the stirrer. Such a reactant deposited on the rotation shaft tends to be thermally decomposed and to become yellowed with the increase in the residence time in the apparatus, which is problematic.

In addition, in the case of the apparatus of JP Patent No. 3419609, a port for supplying a reactant, which is provided to a horizontal container, is located at the upper part of the container, i.e., a part located above the molten liquid level. In this case, the flow of a fluid in the container is disturbed by introducing a reactant thereto, and thus a plug flow is not realized in some cases. That is, backflow occurs in a container, resulting in an increase in the residence time of a reactant and the increased likelihood of yellowing due to thermal decomposition. Further, when a reactant is thermally decomposed, production efficiency decreases, which is problematic.

Meanwhile, in a case in which the apparatus of JP Patent Publication (Kokai) 10-218998 A (1998) or JP Patent Publication (Kokai) No. 2004-10791 A is used instead of the apparatus of JP Patent No. 3419609, no stirring shaft inserted through the virtual rotation center exists, and thus effects of polymer deposition on a stirring shaft can be inhibited. However, a polymer might be deposited on a stirring blade having a face oriented orthogonally with respect to the flow of a reaction solution. In particular, the melt viscosity of the polymer significantly increases as the content of a residual monomer decreases. This is predicted to cause serious effects.

Furthermore, in a case in which the apparatus of JP Patent No. 2523770 is used instead of the apparatus of JP Patent No. 3419609, no stirring shaft inserted through the virtual rotation center exists and a grid stirring blade does not have a face oriented orthogonally with respect to the flow of a reaction solution. Thus, it is predicted that a polymer is less likely to be deposited on a stirring shaft or stirring blades. However, in the cases of the grid stirring blade, the capacity to lift a reaction solution and carry out stirring and degassing is significantly reduced, unless the viscosity of a reaction solution is relatively high. Thus, it is predicted that the degassing capacity becomes poor in the case of a reaction solution having relatively low viscosity at the beginning of the demonomerization step.

Moreover, JP Patent Publication (Kokai) No. 2005-220203 A and JP Patent Publication (Kokai) No. 2007-126601 A do not disclose a technique involving a method or an apparatus for carrying out a demonomerization step subsequent to a ring-opening polymerization step. In such cases, a technique involving an appropriate demonomerization step is necessary for synthesizing a high-quality polymer.

It is an objective of the present invention to inhibit thermal decomposition and yellowing of a polymer caused by deposition of the polymer in a container in a step of removing by degassing an unreacted monomer and the like contained in a polymer as a reactant.

In order to attain the above objective of the present invention, a polymer producing method, comprising stirring polyhydroxycarboxylic acid in a molten state, and which has obtained by subjecting a cyclic dimer of hydroxycarboxylic acid to a ring-opening polymerization reaction and removing by degassing an unreacted cyclic dimer residue at a pressure lower than that for the ring-opening polymerization reaction is provided, wherein the ring-opening polymerization reaction is continuously carried out using a plurality of polymerization tanks connected in series, provided that a horizontal polymerization tank, which comprises a horizontal reaction tank accommodating a stirring body having a stirring shaft located horizontally with respect to the ground, a supply port that is formed at one end side of the horizontal reaction tank for supplying a reactant, a discharge port that is formed at the other end side of the horizontal reaction tank for discharging a reactant, and at least one weir placed in the horizontal reaction tank, is placed in the first stage, and that a vertical polymerization tank, which comprises a vertical reaction tank accommodating a stirring shaft located vertically with respect to the ground, a supply port that is formed at the upper end side of the vertical reaction tank for supplying a reactant, and a discharge port that is formed at the lower end side of the vertical reaction tank for discharging a reactant, is placed in the final stage; and wherein removal by degassing is continuously carried out by supplying a treated substance obtained by the ring-opening polymerization reaction via the supply port located at the one end side of the horizontal tank, allowing the stirring body, which comprises a plurality of rectangular stick frames coupled to orient longitudinally with respect to the tank and which stirring body does not have a stirring shaft inserted through the virtual rotation center, to rotate circumferentially within the tank, discharging the treated substance from the discharge port located at the other end side, and discharging a degassed gas via a degassing port located above the molten liquid level of the treated substance.

With the use of a combination of the ring-opening polymerization step and the degassing step according to the present invention, it is possible to supply a highly reacted polymer, i.e., a highly viscous polymer, in the degassing step. Thus, even rectangular-frame-shaped stirring blades are reliably provided with the ability to lift a reaction solution at the beginning of the degassing step so as to carry out stirring/degassing. Therefore, an apparatus having rectangular-frame-shaped stirring blades can be applied to the degassing step. In addition, the present invention is characterized in that thermal degradation is less likely to occur in both the ring-opening polymerization step and the degassing step. Due to the following reasons, the total effects of reducing thermal degradation become greater than those obtained by simply adding the effects of both steps.

Thermal degradation and thermal decomposition cause cleavage of an ester bond ($-CO-OCH(CH_3)-$) in a polymer molecule. A carboxyl group ($-COOH$) and a vinyl group ($-CH=CH_2$) are separately generated at one end of each of two polymer molecules obtained as a result of such decomposition. A carboxyl group is acidic and thus has a heat-induced catalytic activity that allows other ester bonds to be cleaved, resulting in acceleration of a thermal degradation phenomenon. Thus, synthesis of a polymer that is less likely to be thermally decomposed in the ring-opening polymerization step results in the significant improvement of effects of inhibiting thermal degradation in the degassing step.

Specifically, a polymer producing apparatus, whereby the polymer producing method of the present invention is realized, is a polymer producing apparatus for stirring polyhydroxycarboxylic acid in a molten state obtained by subjecting a cyclic dimer of hydroxycarboxylic acid to a ring-opening polymerization reaction and removing by degassing an unreacted cyclic dimer residue at a pressure lower than that for the ring-opening polymerization reaction, wherein an apparatus for carrying out a ring-opening polymerization reaction is composed of a plurality of polymerization tanks connected in series, provided that a horizontal polymerization tank, which comprises a horizontal reaction tank accommodating a stirring body having a stirring shaft located horizontally with respect to the ground, a supply port that is formed at one end side of the horizontal reaction tank for supplying a reactant, a discharge port that is formed at the other end side of the horizontal reaction tank for discharging a reactant, and at least one weir placed in the horizontal reaction tank, is placed in the first stage, and that a vertical polymerization tank, which comprises a vertical reaction tank accommodating a stirring shaft located vertically with respect to the ground, a supply port that is formed at the upper end side of the vertical reaction tank for supplying a reactant, and a discharge port that is formed at the lower end side of the vertical reaction tank for discharging a reactant, is placed in the final stage; and wherein an apparatus for carrying out removal by degassing is composed of a horizontal stirring tank, a stirring body that is accommodated in the stirring tank and is supported such that it is able to rotate circumferentially within the tank, a supply port that is formed at one end of the stirring tank for supplying a treated substance obtained by the ring-opening polymerization reaction, a discharge port that is formed at the other end thereof for discharging the treated substance, a degassing port that is formed above the molten liquid level of the treated substance in the stirring tank for discharging a degassed gas, a recovery container that is connected to the degassing port for recovering a degassed gas by condensation or solidification, and a vacuum pump that is connected to the recovery container for vacuuming the inside of the tank, provided that the stirring body is formed by coupling a plurality of rectangular stick frames oriented longitudinally with respect to the tank and which does not have a stirring shaft inserted through the virtual rotation center.

In the above case, in view of improvement of plug-flow characteristics, it is preferable that a supply port for supplying a treated substance and a discharge port for discharging a treated substance, which is located on the opposite side of the supply port, be positioned below the molten liquid level of a treated substance. In addition, an apparatus for removing by degassing does not necessarily have a single stage. According to need, such apparatus can be used with other apparatuses not described in the present invention (e.g., degassing apparatuses such as an extruder) by combining them in series or in parallel so as to result in a plurality of stages.

In addition, in view of inhibition of thermal degradation in the degassing step, the supply port of the stirring tank is positioned below the molten liquid level such that the plug flow of the molten solution (plug-flow characteristics) is realized while the treated substance supplied to the stirring tank via the supply port does not disturb the flow of a molten treated substance. Thus, a polymer having a narrow molecular weight distribution and a tendency of being decomposed with difficulty can be synthesized.

Further, regarding a stirring body in the stirring tank, a stirring shaft is located at a distance from the virtual rotation center and a coupling member itself of a rectangular frame rotationally moves around the virtual rotation center at a given circumferential speed. Thus, deposition of a treated substance on a coupling member can be inhibited. In addition, the rectangular-frame-shaped stirring blade is unlikely to be influenced by a treated substance flowing orthogonally with respect to the blade surface, and thus the polymer deposition is reduced, especially in the last half of the degassing step during which a residual monomer decreases. Therefore, an increase in the residence time of a treated substance in the container can be suppressed and yellowing caused by thermal decomposition can be inhibited. Accordingly, a high-molecular-weight and high-quality polymer can be produced.

In addition, the following means is provided: a means for adding at least one of an agent capable of deactivating a catalyst for a ring-opening polymerization reaction and an agent capable of reducing thermal degradation of the treated substance to the treated substance obtained by a ring-opening polymerization reaction before carrying out removal by degassing. In this case, an agent capable of deactivating a polymerization catalyst and an antioxidant for a polymer can be added to and mixed with a treated substance. Thus, it is possible to further improve effects of inhibiting thermal decomposition obtained by the technique of the present invention.

Moreover, a recovery container is provided to the stirring tank to recover a volatile substance contained in a treated substance such that such a volatile substance can be recovered and the recovered substance can be used for desirable purposes. In particular, a high-quality polymer can be synthesized at a high yield by subjecting the recovered substance to the previous step and recycling it as a raw material. In addition, when a volatile substance is recovered in the recovery container, the recovery container is cooled with, for example, a certain cooling means such that the volatile substance can be recovered in a liquid or powder form.

In order to achieve the above objective, the polymer degassing apparatus of the present invention comprises a barrel-shaped horizontal container having, at one end, a supply port for supplying a reactant, and at the other end, a discharge port for discharging the reactant, a stirring means for stirring the reactant to be melted within the horizontal container, and a degassing means for drawing a gas contained in the horizontal container via the degassing port of the horizontal container. In the apparatus, the supply port is positioned below the molten liquid level of the reactant, the degassing means comprises a vacuum pump for drawing a gas contained in the horizontal container via a degassing port located above the molten liquid level of the reactant, and a recovery container (located within the preceding stage of the vacuum pump) for recovering a volatile substance in the gas drawn via the degassing port, and the stirring means comprises a plurality of stirring bodies oriented along the same direction as the axis in the horizontal container and coupling members for coupling the stirring bodies along the same direction as the axis, provided that the coupling members are placed at a distance from the virtual rotation center of the stirring bodies.

According to the present invention, the reactant supply port is positioned below the molten liquid level so that the reactant supplied to the horizontal container does not disturb the flow of a molten reactant and therefore the plug flow of the molten solution can be formed. Further, regarding the stirring means of the present invention, the coupling members are placed at a distance from the virtual rotation center such that the coupling members themselves rotate around the virtual rotation center at a given circumferential speed. Thus, deposition of the reactant on the coupling members can be inhibited. Therefore, an increase in the residence time of a reactant in the container can be suppressed and thus yellowing caused by thermal decomposition can be inhibited. Accordingly, a high-molecular-weight and high-quality polymer can be produced.

Further, according to the present invention, a volatile substance contained in a reactant can be recovered in a recovery container, and thus the recovered volatile substance can be used for desirable purposes.

Furthermore, the polymer degassing method of the present invention comprises: continuously supplying a reactant into a horizontal container while carrying out a vacuum operation in the horizontal container; recovering a volatile substance degassed from the reactant; and subjecting the recovered volatile substance to the previous step to recycle it. In this case, the recovered volatile substance is recycled as a raw material for producing a reactant.

Accordingly, in addition to inhibition of yellowing of a reactant, the recovered unreacted monomer or the like can be recycled as a raw material for a polymer, and thus the polymer production efficiency can be improved. Further, when a volatile substance is recovered in a recovery container, the recovery container is cooled with, for example, a certain cooling means such that the volatile substance can be recovered in a powder form.

EFFECTS OF THE INVENTION

According to the present invention, when an unreacted monomer contained in a reactant such as polylactide formed by a ring-opening polymerization reaction is removed by degassing, thermal decomposition and yellowing of a reactant caused by deposition of a polymer inside a container can be inhibited.

Also, in a case in which a reactant formed by another polymerization reaction (e.g., a solvent contained in polystyrene generated during solvent polymerization) is removed by degassing, thermal decomposition or yellowing of the reactant can be inhibited.

The present description includes part or all of the contents as disclosed in the description and/or drawing of Japanese Patent Applications No. 2007-280121 and No. 2008-069666, which are priority documents of the present application.

DESCRIPTION OF THE PREFERRED EMBODIMENTS

Figure 1:
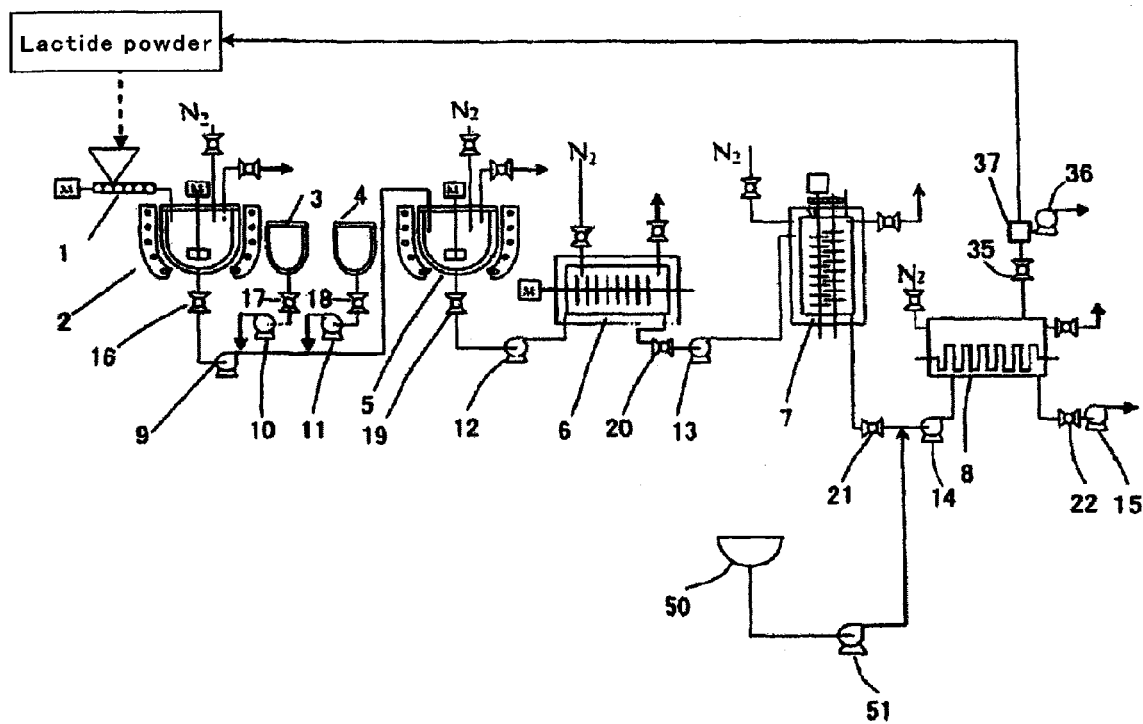
FIG. 1 is a general explanatory view showing a polylactide production process according to the present invention.

Hereinafter, the polymer producing method and apparatus in embodiments according to the present invention comprise: a reaction step and a reactor for subjecting a reactant to a ring-opening polymerization reaction; and a degassing step and a degassing apparatus for subjecting a treated substance generated by the ring-opening polymerization reaction to degassing treatment, respectively, and which are intended to obtain a final substance by removing a volatile substance contained in a treated substance.

Herein, a treated substance (hereinafter referred to as a polymerized product or polymer, according to need) introduced into a degassing apparatus is mainly polylactide, but it is not limited thereto. Also, polyesters synthesized by a ring-opening polymerization reaction of cyclic dimers, such as copolymers containing, as a main component, lactic acid, polyglycolic acid obtained by ring-opening polymerization of glycolide, and copolymers containing, as a main component, glycolic acid can be applied as a product generated by a ring-opening polymerization reaction.

Further, as a treated substance, polymers formed by solvent polymerization can also be applied. Polymers formed by solvent polymerization are polymers generated by subjecting a high-molecular polymer to addition polymerization with another polymer. Examples thereof include copolymers comprising, as a main component, cellulose or acetic acid.

Herein, lactide for use as a raw material of polylactide refers to a cyclic ester generated by dehydration of two water molecules from two lactic acid molecules, and polylactide refers to a polymer comprising, as a main component, lactic acid, and includes poly L-lactic acid homopolymers, poly D-lactic acid homopolymers, poly L/D-lactic acid copolymers, copolymerized polylactides obtained by copolymerization of these polylactides with other ester bond forming components such as hydroxycarboxylic acids, lactones, dicarboxylic acids, and diol, and substances obtained by mixing these polymers with additives as subcomponents.

Glycolide refers to a cyclic ester generated by dehydration of two water molecules from two glycolic acid molecules. Polyglycolic acid refers to polymers comprising, as a main component, glycolic acid, and includes copolymerized polyglycolic acids obtained by copolymerization of these polyglycolic acids with other ester bond forming components such as hydroxycarboxylic acid, lactones, dicarboxylic acid, diol, and substances obtained by mixing these polymers with additives as subcomponents.

Examples of a hydroxycarboxylic acid other than lactic acid and glycolic acid include hydroxybutylcarboxylic acid and hydroxybenzoic acid, examples of lactones include butyrolactone and caprolactone, examples of dicarboxylic acids include $C_{4-20}$ aliphatic dicarboxylic acids, and aromatic dicarboxylic acids such as phthalic acid, isophthalic acid, terephthalic acid and naphthalene dicarboxylic acid, and examples of diols include $C_{2-20}$ aliphatic diols. Oligomers and polymers of polyalkylene ethers such as polyethylene glycol, polypropylene glycol, and polybutylene ether are also used as copolymerization components. Similarly, oligomers and polymers of polyalkylene carbonate are used as copolymerization components.

Examples of additives include antioxidants, stabilizers, ultraviolet absorbers, pigments, colorants, inorganic particles, various kinds of fillers, release agents, plasticizers, and other similar agents. The content of the copolymerization components and additives is not limited, but preferably, the main component is lactic acid or a substance derived from lactic acid, and the content of the copolymerization components and additives is 50% by weight or less and especially 30% by weight or less.

According to the polymer producing method and the polymer producing apparatus in this embodiment, a polymer degassing method and a polymer degassing apparatus is intended to remove a monomer, an oligomer, or the like contained in a polymer synthesized by polymerization of a raw material in a molten state or to remove a medium used for melting. The raw material (reactant) refers to monomers, cyclic monomers, cyclic condensates of monomers, oligomers, and the like, which are constituent components for synthesis of the polymer by the polymerization reaction.

In synthesis of polylactide, lactide is used as a raw material and a reaction solution containing lactide as a raw material in a molten state and a catalyst is heated in the reactor to carry out a ring-opening polymerization reaction of lactide, whereby lactide in a molten state is polymerized to synthesize polylactide continuously and intermittently. Also, in synthesis of polyglycolic acid, glycolide is used as a raw material and a reaction solution containing glycolide as a raw material in a molten state and a catalyst is heated in a reactor to carry out a ring-opening polymerization reaction of glycolide, whereby glycolide in a molten state is polymerized to synthesize polyglycolic acid. Herein, the reaction solution includes all molten materials, products, and the like that flow during the polymer synthesis, such as a molten polymer raw material, mixtures of the molten raw material and a catalyst, and mixtures of the molten raw material, a catalyst, and various kinds of polymerized products of different polymerization degrees.

If the raw material is in a molten state, the molten raw material may be supplied directly to the reactor with the addition of a catalyst for the polymerization reaction, but if the raw material is a solid material such as a powder, the raw material is melted in advance by heating the raw material by a raw material melting apparatus. The heating temperature in the raw material melting apparatus is not particularly limited as long as it equals a melting point of the raw material or higher. Thus, if the raw material is lactide, the temperature is not particularly limited as long as it is 95° C. or higher, but the temperature is usually 95 to 160° C. and preferably 110 to 130° C. By limiting the temperature to 160° C. or lower, degradation of lactide with heat can be prevented. In addition, when the raw material is glycolide, the temperature is not particularly limited as long as it is 83° C. or higher. It is generally 83° C. to 160° C. and preferably 90° C. to 130° C. By limiting the temperature to 160° C. or lower, degradation of glycolide with heat can be prevented.

For the catalyst for the polymerization reaction, those skilled in the art can appropriately select a suitable one according to a polymer to be synthesized. For example, for the catalyst used for ring-opening polymerization of lactide or glycolide, a well known catalyst for polymerization of polylactide or polyglycolic acid, and for example, a catalyst containing at least one type of metal or metal compound selected from the group consisting of elements of IA, IVA, IVB and VA groups of the periodic table may be used.

Examples of those belonging to the IVA group include organic tin based catalysts (e.g. tin lactate, tin tartrate, tin dicaprylate, tin dilaurylate, tin dipalmitate, tin distearate, tin dioleate, tin α-naphthoate, tin β-naphthoate, and tin octylate) and powder tin. Examples of those belonging to the IA group include hydroxides of alkali metals (e.g. sodium hydroxide, potassium hydroxide, and lithium hydroxide), salts of alkali metals and weak acids (e.g. sodium lactate, sodium acetate, sodium carbonate, sodium octylate, sodium stearate, potassium lactate, potassium acetate, potassium carbonate, and potassium octylate), and alkoxides of alkali metals (e.g. sodium methoxide, potassium methoxide, sodium ethoxide, and potassium ethoxide). Examples of those belonging to the IVB group include titanium based compounds such as tetrapropyl titanate, and zirconium based compounds such as zirconium isopropoxide. Examples of those belonging to the VA group include antimony based compounds such as antimony trioxide. Among them, the organic tin based catalyst or tin compound is preferable in terms of activity.

The catalyst can be added to the molten raw material by a catalyst adding apparatus that is usually used in the art. The catalyst may be added to the molten raw material before supplying the molten raw material to the reactor, or the catalyst may be added directly to the reactor.

In the present invention, the reactor for polymerizing the raw material comprises two or more reaction tanks connected in series, wherein the polymerization reaction is carried out by heating a reaction solution containing a molten raw material and a catalyst in the reaction tanks. The reactor should comprise two or more reaction tanks, and comprises normally two to five, preferably two or four, and more preferably two reaction tanks. Note that, if there is no particular problem, a reactor comprising a single reaction tank may be used for additionally adding a raw material and stirring/mixing with an intermediate polymerized product between a port for supplying a raw material for a polymer and a port for discharging a final polymerized product.

Hereinafter, a reactor and a reaction method for a polymerization reaction and a degassing apparatus and a degassing method for degassing treatment are described with reference to embodiments.

In the embodiments of the present invention, a molten raw material is additionally added to a polymerized product as an intermediate between a molten raw material and a final polymerized product in a reactor, followed by stirring/mixing. The shape and other conditions of the reaction tank are not particularly limited. Reaction tanks generally used in the art can be used. Also, there is no particular problem even in a case in which a tank in which a polymerization reaction is not substantially carried out is connected to the fore stage of a tank in which a polymerization reaction is carried out. Herein, as a reactor for carrying out a polymerization reaction, a reactor comprising two reaction tanks connected in series is described.

A first stage reaction tank is not particularly limited, and those generally used in the art can be used. It is preferable to use a reaction tank containing a stirrer placed with its rotation axis (stirring shaft) oriented substantially horizontally with respect to the ground and at least one weir placed within the tank. Hereinafter, the above reaction tank having the stirrer placed with its rotation axis oriented substantially horizontally with respect to the ground is referred to as a horizontal reaction tank.

The term "substantially horizontally with respect to the ground" does not mean that the rotation axis of the stirrer is located accurately horizontally with respect to the ground, but means that the angle between the ground (i.e., the horizontal line) and the rotation axis is usually −5° to 5°, preferably −1° to 1°, and more preferably 0°.

The shape of the horizontal reaction tank is not particularly limited, and may be a tank shape or barrel shape as long as it allows the stirrer to be placed with its rotation axis substantially horizontally with respect to the ground. However, it is preferably a cylindrical shape having a central axis substantially horizontally with respect to the ground. In addition, the horizontal reaction tank has, at one end in the direction of the rotation axis of the stirrer, a supply port for supplying a reaction solution containing a molten raw material and has, at the other end, a discharge port for taking out the reaction solution. Thus, the supplied reaction solution moves substantially in the horizontal direction from the supply port to the discharge port. The supply port is preferably located below the shaft of the stirrer, and the discharge port is preferably located below the rotation axis of the stirrer.

A stirrer is composed of a mixer comprising single-shaft mixers in which two or more stirring blades having circular, oblong, triangular, quadrangular, and multilobar shapes and other shapes are placed with spaces between them on the rotation shaft, and a double-or-more-shaft mixer having two or more shafts in which those stirring blades mutually engage. A stirrer comprising a double-or-more-shaft mixer in which the stirring blades mutually engage is preferable in terms of self-cleaning action because the reaction solution can be prevented from being deposited on the rotation shaft of the stirrer and the reaction tank. If a double-shaft mixer having a plurality of stirring blades is used, stirring blades of rotation shafts are preferably placed in a staggered form, and the rotation shafts are preferably rotated in opposite directions. A rotation axis does not necessarily include just a rotation shaft member that actually exists at the virtual rotation center of a rotation blade; but it also includes a rotation axis line at a rotation center. Thus, if the virtual rotation center of rotational motion of the stirrer is oriented substantially horizontally with respect to the ground, a rotation shaft member does not necessarily exist at the virtual rotation center of a rotation blade.

For the heating method in the horizontal reaction tank, a method that is usually used in the art may be used. In this embodiment, a method in which a jacket of a heat medium is placed on the outer periphery of the reaction tank, and the reaction solution is heated by heat transfer through the wall surface of the reaction tank is used, but it is not limited thereto. For instance, a method wherein a heat medium is passed through inside the rotation shaft of the stirrer, and the reaction solution is heated by heat transfer is used. These methods may be used alone or in combination. The reaction tank is preferably heated at a substantially constant temperature.

The molten raw material supplied into the horizontal reaction tank is initially heated by the above heat medium jacket and polymerized. However, when the temperature of the reaction solution becomes higher than that of the heat medium due to a rise in temperature associated with reaction heat, heat is conversely transferred from the reaction solution to the heat medium. That is, the above heating method can act as a cooling method as well. Thus, in the case of a polymerization reaction heat with the polymerization reaction, heat can be advantageously dissipated effectively.

A heating method in which the interior of the reaction tank is segmented into a plurality of areas and the temperature of the heat medium can be varied for each segmented area may be used as required. It can be considered that a plurality of heat medium jackets are used for this purpose. For example, the interior of the reaction tank can be segmented based on areas between weirs. This makes it possible to set the temperature of the heat medium to a high level in an area where the reaction solution of low temperature is heated, and conversely to set the temperature of the heat medium to a low level in an area where the temperature of the reaction solution is increased due to reaction heat and thus removal of heat is required, for example. By supplying the heat medium heated by a heat medium heating apparatus to the vicinity of the supply port, a temperature gradient can be set in the reaction tank. When the temperature of the heat medium decreases, a part of the molten material may be solidified and deposited on the inner surface of the reaction tank, but in this case, the deposited material can be scratched off by the stirrer placed in the reaction tank.

The horizontal reaction tank has a weir placed in the tank. This weir functions to inhibit the rapid flow of the reaction solution from the supply port to the discharge port. The shape of the weir may be determined based on the shape of the reaction tank, and it is preferably laminar, provided that the flow of the reaction solution can be disturbed by the weir. The way in which the weir is placed is not particularly limited, but, for example, if the weir is laminar, it is placed at an angle of approximately 90° with respect to the ground. Furthermore, the weir is placed on the inner wall on the bottom of the reaction tank so that the lower part, such as the lower half or lower one-third of a vertical cross section of the reaction tank (such cross section including the axial section of the rotation axis of the stirrer), is obstructed. Here, an angle of approximately 90° with respect to the ground means that the angle between the ground and the laminar weir is 85° to 95°, preferably 89° to 91°, and more preferably 90°. For the material of the weir, a thermally insulating material is preferably used.

In terms of improvement of fluidity of the polymer, through-holes may be provided in the weir, and the through-holes exist near the bottom of the reaction tank and preferably at the border with the inner wall of the bottom of the reaction tank. The number of through-holes is usually 1 to 10 and preferably 1 to 5. By providing the through-holes, the reaction solution can be made to flow at an appropriate speed. Those skilled in the art can appropriately determine the placement position and spacing of the weir based on reaction conditions and the like. For example, the placement position can be determined so that areas similar in viscosity distribution of the polymer are separated from one another. Furthermore, after the placement position of the weir in the reaction tank is determined, the diameter of the through-hole can be determined so that the resistance with which the reaction solution at a given amount passes through the through-hole is smaller than a driving force by a head difference of the reaction solution between before and after the weir. The area between two such weirs acts like a single mixing cell, and the reaction solution is homogenized by stirring with the stirrer. Consequently, the molten low-viscosity raw material and a low-viscosity polymerized product having a low polymerization degree flow at a higher speed than a high-viscosity polymerized product having a high polymerization degree, thus making it possible to limit the effects of mixing the former and the latter. In addition, when a certain degree of viscosity of a polymerized product can be expected and the effects of mixing polymerized products having different viscosities are small, the weirs may be omitted.

By providing a head difference between the supply port and the discharge port in the horizontal reaction tank, a force that drives the reaction solution to move from the supply port to the discharge port can be provided. The reaction solution flows through the through-hole of the weir, or the reaction solution situated at a position higher than the weir flows to an area in the rear stage due to the head difference, whereby the reaction solution can be transferred toward the discharge port. In the horizontal reaction tank, the amount of reaction solution supplied is not particularly limited, but the reaction solution is supplied in an amount such that the solution enters the horizontal reaction tank, accounting for usually 10% to 70% and preferably 40% to 50% of the volume of the tank. Furthermore, it is preferably supplied in an amount corresponding to a level that does not exceed the height of the weir, such that unreacted lactide can be effectively inhibited from rapidly flowing. By installing an apparatus measuring the liquid level of the reaction solution as required in the horizontal reaction tank and by feeding back measurement signals to, for example, a liquid feeding pump at the supply port of the reaction tank or a liquid feeding pump at the discharge port of the reaction tank, the amount of reaction solution fed can be adjusted so that the height of the liquid level equals a predetermined value.

Examples of the method for measurement of the liquid level include: a method in which a radioactive material is placed in the upper part of the horizontal reaction tank and the liquid level is measured based on the amount of gamma rays (generated from the material) transmitted through the reaction solution; a method in which an ultrasonic wave or electromagnetic wave is emitted from the upper part of the horizontal reaction tank so as to measure the reflected wave, whereby the liquid level is measured; and a method in which a barrel condenser is placed in the upper part of the horizontal reaction tank and put into the reaction solution, following which a change in dielectric constant associated with the level of the reaction solution in the barrel is measured so as to measure the liquid level.

Those skilled in the art can appropriately determine reaction conditions in the horizontal reaction tank in the first stage, but the average reaction temperature in the reaction tank is usually 140° C. to 180° C. and preferably 160° C. to 170° C., and the residence time is usually 5 to 15 hours and preferably 7 to 10 hours. The reaction conditions are preferably set so that a polymerized product having a weight average molecular weight of normally 50 to 200 thousands and preferably 70 to 150 thousands can be obtained from the discharge port of the horizontal reaction tank of the first stage.

By setting the first stage reaction tank to the horizontal reaction tank, and providing the above weir within the first stage reaction tank, the molten raw material having a low viscosity and a polymerized product having a low polymerization degree and a low viscosity can be inhibited from being mixed with a polymerized product undergoing a polymerization reaction to some extent to ensure piston flowability in the reaction tank. The reaction solution in an unreacted state can be prevented from proceeding to a next step and sufficiently reacted in the first stage reaction tank. Thus, prolonged temperature history resulting from variations in residence time is prevented, and therefore degradation of the polymerized product due to thermal decomposition is inhibited, thus making it possible to obtain a high-quality polymer.

A reactor comprising, at least in the final stage, a reaction tank having a stirrer placed such that its rotation axis is oriented substantially vertically with respect to the ground is used as a reactor for carrying out a polymerization reaction. Hereinafter, the above reaction tank having a stirrer placed such that its rotation axis (stirring shaft) is oriented substantially vertically with respect to the ground is referred to as a vertical reaction tank. In this embodiment, at least a vertical reaction tank is used in the final stage, but a vertical reaction tank may be used also in stages other than the final stage. The shape and other conditions of reaction tanks other than the final stage reaction tank are not particularly limited, and those that are usually used in the art may be used. In addition, the vertical reaction tank in the final stage may be connected to a tank in the subsequent stage in which substantially no polymerization reaction is carried out.

The term "substantially vertically with respect to the ground" does not mean that the rotation axis of the stirrer is located accurately vertically with respect to the ground, but means that the angle between the ground (i.e., the horizontal line) and the rotation axis is usually 85° to 95°, preferably 89° to 91°, and more preferably 90°. Like the horizontal reaction tank, the above rotation axis does not necessarily mean just a rotation shaft member that actually exists at the virtual rotation center of a rotation blade; but it also includes a rotation axis line at a rotation center. Thus, if the virtual rotation center of rotational motion of the stirrer is oriented substantially vertically with respect to the ground, an actual rotation shaft member does not necessarily exist at the virtual rotation center of a rotation blade.

The shape of the vertical reaction tank is not particularly limited, and may be a tank shape or barrel shape as long as it allows the stirrer to be placed with its rotation axis substantially vertically with respect to the ground, but it is preferably a cylindrical shape having a centeral axis substantially in parallel to the rotation axis of the stirrer. The vertical reaction tank has, at one end in the direction of the rotation axis of the stirrer, a supply port for supplying the reaction solution from the reaction tank in the preceding stage and has, at the other end, a discharge port for taking out the reaction solution. Thus, the supplied reaction solution moves substantially in the vertical direction from the supply port to the discharge port. It is preferable that the supply port exists in the upper part of the reaction tank, and the discharge port exists in the lower part of the reaction tank. The specific gravity of the polymerized product increases with progression of the polymerization reaction, and therefore, by providing the supply port in the upper part, a polymerized product having a low polymerization degree can be inhibited from being mixed with a polymerized product having a high polymerization degree.

The stirrer placed in the vertical reaction tank is not particularly limited as long as it stirs with rotation around the rotation axis placed substantially vertically to the ground. Examples of the mixer include a single-shaft mixer in which two or more stirring blades having circular, oblong, triangular, quadrangular, and multilobar shapes and other shapes are placed with spaces on the rotation shaft, and a double-or-more-shaft mixer having two or more shafts in which those stirring blades mutually engage. In a stirrer comprising a double-or-more-shaft mixer having two or more shafts in which those stirring blades mutually engage, stirring blades of rotation shafts are preferably placed in a staggered form. In this case, the rotation shafts are preferably rotated in opposite directions. The double-or-more-shaft stirrer in which those stirring blades mutually engage can prevent deposition of the polymerized product and the like on the rotation shaft of the stirrer and the reaction tank. Further, in terms of the self-cleaning action, it is especially advantageously used in the rear stage reaction tank in which the polymerization reaction proceeds and the viscosity of the polymerized product increases.

As in the case of the horizontal reaction tank, for the heating method in the vertical reaction tank, a method that is usually used in the art may be used. In this embodiment, a method in which a jacket of a heat medium is placed on the outer periphery of the reaction tank, and the reaction solution is heated by heat transfer through the wall surface of the reaction tank is used. For example, a method in which a heat medium is passed through the rotation shaft of the stirrer, and the reaction solution is heated by heat transfer may also be used. These methods may be used alone or in combination.

The molten prepolymer supplied into the vertical reaction tank is initially heated by the above heat medium and its polymerization reaction thus proceeds. However, when the temperature of the reaction solution becomes higher than that of the heat medium due to a rise in temperature associated with reaction heat, heat is conversely transferred from the reaction solution to the heat medium. Thus, as in the case of the horizontal reaction tank, a heating method in which the interior of the reaction tank is segmented into a plurality of areas and the temperature of the heat medium can be varied for each segmented area may be used as required. In this way, it is possible to set the temperature of the heat medium to a high level in an area where the reaction solution of low temperature is heated, and conversely set the temperature of the heat medium to a low level in an area where the temperature of the reaction solution is increased due to reaction heat and thus removal of heat is required, for example. If further removal of heat is required, heat removal efficiency can be further improved by, for example, providing fins (irregularities on the side face of the reaction tank) in the vertical reaction tank. Furthermore, in one embodiment, it would be possible to prevent a polymer from being excessively cooled by supplying a heat medium heated by a heat medium heating apparatus to the vicinity of the discharge port so as to keep the heat of the polymer.

In the rear stage of the polymerization reaction, the reaction is carried out preferably at a high temperature, and therefore there arises a problem of degradation of the polymerized product associated with a rise in temperature. However, by using the vertical reaction tank in the final stage, the rise in temperature can be inhibited, and degradation and yellowing of the polymerized product can be alleviated.

In the vertical reaction tank, the amount of a reaction solution supplied is not particularly limited, but the reaction solution is supplied in an amount such that the solution is filled in the vertical reaction tank, accounting for usually 20% to 100% and preferably 60% to 100% of the volume of the tank. Thus, compared with the conventional horizontal reaction tank in which the reaction solution is introduced usually in an amount as small as the half volume of the reaction tank, the area of the reaction solution contacting the inner wall of the reaction tank is large, thus making it possible to increase the area of heat-transfer surface. By removing reaction heat associated with polymerization (prepolymer) by heat transfer, a rise in temperature of the reaction solution can be reduced, and in the rear stage of the polymerization reaction, degradation of the produced polymerized product associated with thermal decomposition can be effectively inhibited such that yellowing can be prevented. Particularly in ring-opening polymerization of lactide, yellowing of polylactide can be effectively prevented. Furthermore, by making the vertical reaction tank to have irregularities on the side face, the area of heat-transfer surface can be further increased, and heat removal efficiency can be improved. In the above configuration in which irregularities are provided on the side face, a polymerized product with high-viscosity stuck to the inner wall of the reaction tank can be scratched off by placing stirring blades in a manner such that they engage with recessed portions of the reaction tank.

In the vertical reaction tank, like the horizontal reaction tank, by installing an apparatus measuring the liquid level of the reaction solution as required and by feeding back measurement signals to a liquid feeding pump at the supply port of the reaction tank or to a liquid feeding pump at the discharge port of the reaction tank, the amount of reaction solution fed can be adjusted so that the height of the liquid level equals a predetermined value. Examples of the method for measurement of the liquid level include: a method in which a radioactive material is placed in the upper part of the vertical reaction tank and the liquid level is measured based on the amount of gamma rays (generated from the material) transmitted through the reaction solution; a method in which an ultrasonic wave or electromagnetic wave is emitted from the upper part of the vertical reaction tank so as to measure the reflected wave, whereby the liquid level is measured; and a method in which a barrel condenser is placed in the upper part of the vertical reaction tank and put into the reaction solution, following which a change in dielectric constant associated with the level of the reaction solution in the barrel is measured so as to measure the liquid level.

Those skilled in the art can appropriately determine reaction conditions in the vertical reaction tank in the final stage, but the average reaction temperature in the reaction tank is usually 180° C. to 220° C. and preferably 190° C. to 210° C., and the residence time is usually 1 to 7 hours and preferably 3 to 5 hours. The reaction conditions are preferably set so that a polymerized product having a weight average molecular weight of normally 100 to 500 thousands and preferably 150 to 300 thousands can be obtained from the discharge port of the vertical reaction tank in the final stage.

In the apparatus for producing a polymer in this embodiment, a degassing apparatus can be installed in the rear stage of the reactor for polymerization to remove an unreacted raw material from the final polymerized product discharged from the reactor. In the degassing apparatus, a vacuum environment is created while a molten state is maintained, whereby the unreacted raw material or a medium is removed, for example, lactide is removed from polylactide.

A degassing apparatus has a structure in which the virtual rotation center of rotational motion of the stirrer is oriented substantially horizontally with respect to the ground and no rotation shaft member inserted through the virtual rotation center exists. Hereinafter, the degassing apparatus in this embodiment is referred to as a shaftless horizontal stirring apparatus.

The term "substantially horizontally with respect to the ground" used herein does not mean that the virtual rotation center of the stirrer is oriented accurately horizontally with respect to the ground, but means that the angle between the ground (i.e., the horizontal line) and the rotation center is usually −5° to 5°, preferably −1° to 1°, more preferably 0°.

The shape of the shaftless horizontal stirring apparatus is not particularly limited, and may be a tank shape or barrel shape as long as it has a structure in which a horizontal container accommodates a stirrer and the horizontal container can be installed such that the virtual rotation center of rotation motion of the stirrer is oriented substantially horizontally with respect to the ground. However, it is preferably a cylindrical shape or a shape composed of cylinders having their central axis oriented substantially horizontally with respect to the ground. In addition, the horizontal reaction tank has, at one end in the direction of the rotation axis line of the stirrer, a supply port for supplying a reaction solution (treated substance) containing a molten raw material to be formed into a final polymerized product and has, at the other end, a discharge port for removing the treated substance subjected to degassing. Thus, the supplied reaction solution moves substantially in a horizontal direction from the supply port to the discharge port.

The supply port is always located below the reaction solution liquid level in the horizontal container. Accordingly, the flow of a reaction solution is not disturbed when a reactant is supplied, such that the plug flow can be realized. Therefore, thermal decomposition associated with an increase in the residence time of the treated substance can be inhibited, resulting in inhibition of yellowing. As in the case of the supply port, the discharge port is preferably placed below the rotation center of the stirrer.

A stirrer installed in the shaftless horizontal stirring apparatus has a stirring body that comprises a stirring blade having a plurality of rod-shaped rectangular frames coupled longitudinally with respect to the tank and rotating circumferentially within the tank. The stirrer is composed of a single-shaft mixer or double-or-more-shaft mixer in which the stirring blades mutually engage, provided that no stirring shaft inserted through the virtual rotation center exist.

In the case of such stirrer, the rectangular frames rotationally move around the virtual rotation center at a given circumferential speed such that deposition of a reactant on a coupling member can be inhibited. Accordingly, a less-discolored, high-molecular-weight, and high-quality polymer can be produced by inhibiting the thermal decomposition of a reactant. In addition, as an example of the stirrer, a grid blade polymerization processor (Hitachi, Ltd.) and a stirrer described in JP Patent Publication (Kokai) No. 2004-10791 A can be used.

Further, in the case of a shaftless horizontal stirring apparatus, a degassing port is provided to a horizontal container to degas a gas in the container. An inlet port of a vacuum pump is connected to the degassing port via a recovery apparatus for a volatile substance to be degassed, such that a vacuum condition is maintained inside the shaftless horizontal stirring apparatus tank. For instance, lactide degassed from polylactide is recovered in a recovery container. In the recovery container, a volatile substance can be recovered in a liquid or solid form by cooling with a well-known cooling means. A recovery container that can be used is any single-staged container or multistaged container obtained by combining containers in series or in parallel. The thus recovered lactide can be recycled as, for example, a raw material used for polylactide production, and thus polylactide production efficiency can be improved. Examples of a vacuum pump include an oil-sealed rotary vacuum pump, an oil diffusion vacuum pump, a Roots vacuum pump, an ejector vacuum pump, and other vacuum pumps. Any of them or a plural-stage set obtained by combining them in series or in parallel may be used. Thereafter, the waste gas is emitted outside the system via a vacuum pump.

A polylactide from which lactide has been degassed via a shaftless horizontal stirring apparatus is usually subjected to pelletization processing or the like by water cooling and a chip cutter, but such processing may be omitted.

In this embodiment, each of the raw material melting apparatus, the catalyst supplying apparatus, the reactor comprising the individual reaction tanks, the degassing apparatus, and the like, which are used in the polymer producing apparatus, is provided with a nitrogen gas supplying pipe for supplying nitrogen gas and a nitrogen gas discharging pipe for purging the interior of such an apparatus or tank. Essentially, the operation of the synthesis process is initiated preferably after all apparatuses in the process are purged with nitrogen. This allows the reaction solution to be prevented from being scorched due to existence of oxygen. Furthermore, preferably, the raw material melting apparatus, the catalyst supplying apparatus, the raw material supplying apparatus, the individual reaction tanks, and the like are operated at approximately atmospheric pressure in order to reduce the volatilization of the molten raw material.

EXAMPLES

The present invention is hereafter described in greater detail with reference to the drawings, although the technical scope of the present invention is not limited thereto.

Figure 2:
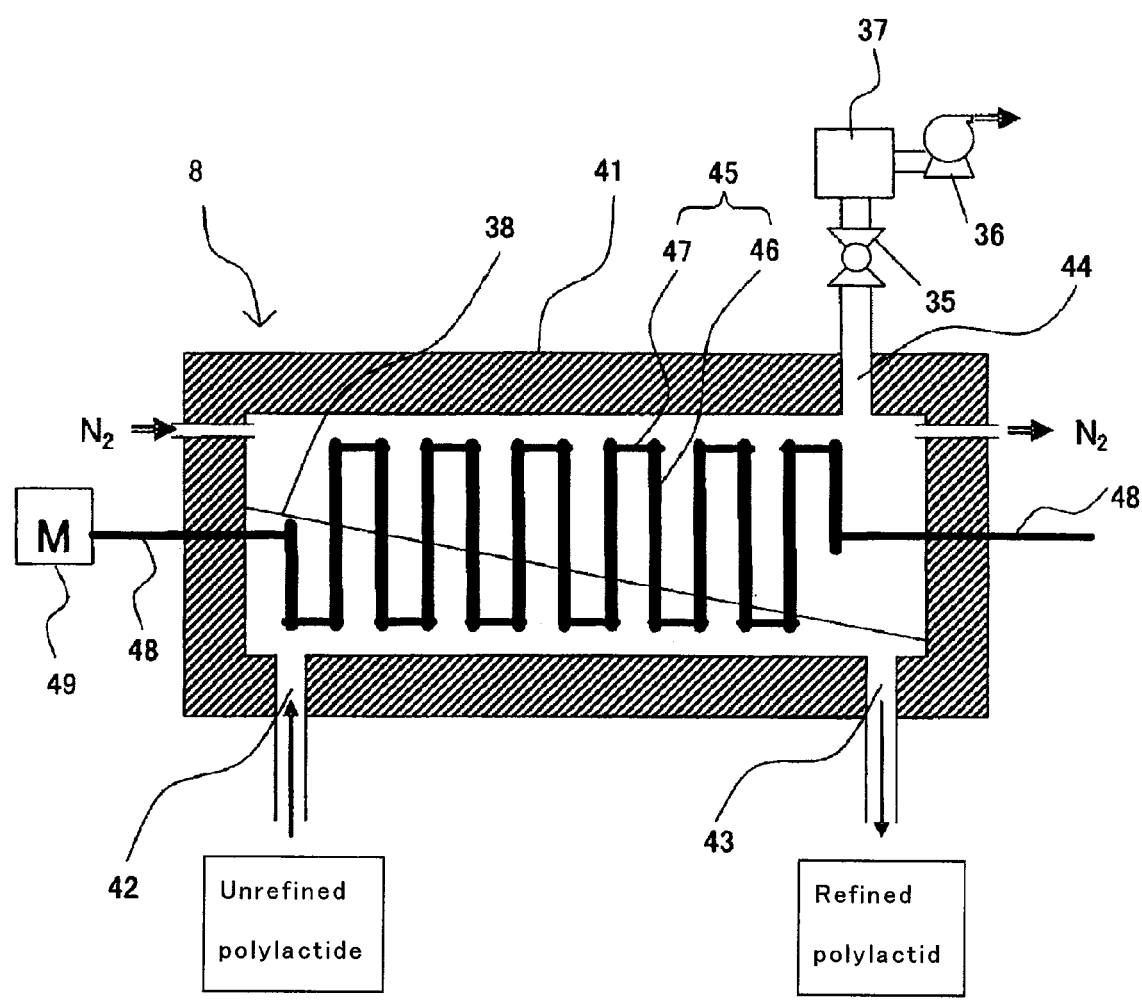
FIG. 2 is a cross-sectional view of a polylactide degassing apparatus according to the present invention.

FIG. 1 is a general explanatory view showing a polylactide production process according to the present invention. FIG. 2 is a cross-sectional view of a polylactide degassing apparatus according to the present invention.

The production process in this Example comprises a reaction step of producing polylactide by polymerization and a degassing step of subjecting polylactide polymerized in the reaction step to degassing treatment. In the reaction step, polylactide polymerization is carried out in a structure comprising a lactide supplying apparatus 1, a lactide melting apparatus 2, a catalyst supplying apparatus 3, a polymerization initiator supplying apparatus 4, a lactide supplying apparatus 5, a horizontal reaction tank 6, and a vertical reaction tank 7. Regarding reaction tanks, two reaction tanks, which are the horizontal reaction tank 6 and the vertical reaction tank 7, are connected in series. In the degassing step, a structure comprises a degassing apparatus 8 and a recovery container 37 in a manner such that unreacted lactide removed in the degassing apparatus 8 is recovered into the recovery container 37. Some of liquid feeding pumps 9 to 15 may be omitted if, for example, a liquid to be fed has low viscosity and thus can be gravity-fed. In addition, bulbs or valves 16 to 22 may also be omitted according to need.

The lactide supplying apparatus 1 supplies lactide in a solid or powder form to the lactide melting apparatus 2. Examples of the transportation method of the lactide supplying apparatus 1 include transportation by a screw feeder, transportation by ultrasonic vibrations, and transportation by gas flow. In the lactide melting apparatus 2, supplied lactide is heated and melted. The temperature at this time is the melting point of lactide or higher, and it is desirably at 160° C. or lower so that degradation by heat does not occur. When lactide as a raw material is supplied in a liquid form but not in a solid or powder form, a lactide supplying apparatus 1 functions as a liquid feeding pump and a lactide melting apparatus 2 functions as a buffer tank.

Molten lactide produced in the lactide melting apparatus 2 is discharged by the liquid feeding pump 9 after the bulb or valve 16 is opened. Then, the bulbs or valves 17 and 18 are opened and the pumps 10 and 11 are used to allow the catalyst supplying apparatus 3 and the polymerization initiator supplying apparatus 4 to supply a catalyst and a polymerization initiator, respectively, to the molten lactide. Thereafter, the molten lactide is supplied to a lactide supplying apparatus 5. In addition, it is possible to appropriately predetermine (according to need) the flow volume of molten lactide discharged by the liquid feeding pump 9, the proportion of the amount of a catalyst supplied from the catalyst supplying apparatus 3 with respect to the flow volume of molten lactide, and the proportion of a polymerization initiator supplied from the polymerization initiator supplying apparatus 4 with respect to the flow volume of molten lactide.

In the lactide supplying apparatus 5, the molten lactide temperature is kept at the melting point of lactide or higher and desirably at 160° C. or lower. The lactide supplying apparatus 5 is essentially a buffer tank, and it may be omitted if not required. The molten lactide in the lactide supplying apparatus 5 is continuously supplied to the horizontal reaction tank 6 by the liquid feeding pump 12 by opening the bulb or valve 19. If the lactide supplying apparatus 5 is omitted, the liquid feeding pump 12 is also omitted. Liquid feeding pipes located in front of or behind the liquid feeding pumps 9, 12, and 13 are all kept at the melting point of lactide or higher and desirably at 160° C. or lower by means for heating, thermal insulation, and the like to avoid solidification and clogging of lactide associated with a drop in temperature. A thermocouple is inserted into each of the lactide melting apparatus 2, the lactide supplying apparatus 5, and pipes located in front of or behind the liquid feeding pumps 9, 12, and 13 for measuring the temperature of a molten raw material at each point.

In the horizontal reaction tank 6, the molten lactide flows based on the head difference between a supply port and a discharge port and is heated by a jacket of a heat medium located in the outer periphery of the reaction tank. Thus, a polymerization reaction proceeds.

The reaction solution discharged from a discharge port of the horizontal reaction tank 6 is transported via the pump 13 to the supply port located in the upper part of the vertical reaction tank 7, and it flows toward the discharge port in the lower part of the vertical reaction tank 7 by gravity. Thus, a polymerization reaction proceeds. In this way, a polymerized product having a low polymerization degree is prevented from being mixed with a polymerized product having a high polymerization degree. In the vertical reaction tank 7, the reaction solution is heated by the jacket of the heat medium in the outer periphery of the reaction tank, or it is cooled when the heat medium temperature is lower than the temperature of a polymerized product.

In the vertical reaction tank 7, the heat transfer area can be increased over that of the horizontal reaction tank 6, and therefore efficiency of heating and removal of heat is high. Thus, by using the vertical reaction tank 7 in the final stage, degradation of the polymerized product resulting from a rise in temperature associated with reaction heat can be alleviated. In the vertical reaction tank 7, a stirrer having two rotation shafts provided with stirring blades suitable for the stirring of a polymerized product having a high viscosity is used. The reaction solution in the vertical reaction tank 7 is continuously discharged and transported to the degassing apparatus 8 by gravity and the liquid feeding pump 14 while a bulb or valve 21 is opened. As the liquid feeding pump 14, a drawing screw, gear pump, or the like can be selected based on the viscosity of the reaction solution. Transportation pipes located in front of or behind the liquid feeding pump 14 should be heated and thermally insulated to avoid clogging associated with solidification of the reaction solution therein. The temperature at this time is desirably 200° C. or lower so that the polymerized product is not thermally decomposed.

When discharge is carried out by the liquid feeding pump 14, an additive is supplied from an additive tank 50 with the use of a supply pump 51 at a point between the pump and the vertical reaction tank 7. Herein, an additive is a catalyst quencher, an antioxidant, another appropriate substance, or a combination of any thereof in appropriate amounts. The additive added is mixed with a polymerized product using the shearing force of the liquid feeding pump 14. In addition, if a dedicated mixer is available, the point at which the additive is supplied may be a point behind a liquid feeding pump 14.

As described above, a polymerized product polymerized in the reaction step (i.e., polylactide) is supplied to the degassing apparatus 8 used in a degassing step. In the degassing apparatus 8, polylactide is maintained in a molten state, a vacuum environment is created, unreacted lactide is removed, and refined polylactide is discharged.

As shown in FIG. 2, the degassing apparatus 8 in this Example is composed of a horizontal container 41, a mixer 45, a vacuum pump 36, and a recovery container 37. A supply port 42 for supplying unrefined polylactide is provided to the lower part of one end of the horizontal container 41 formed in a hollow cylindrical shape. A discharge port 43 for discharging refined polylactide is provided to the lower part of the other end thereof. A degassing port 44 for drawing a gas contained in the container is provided to the upper part of the other end of the horizontal container 41. A pipe is connected to the degassing port 44 and a degassing bulb or valve 35 is provided to the pipe. The recovery container 37 is connected to a pipe located downstream of the degassing bulb or valve 35. The vacuum pump 36 is connected to the recovery container 37. A gas suctioned from the horizontal container 41 with the vacuum pump 36 is recovered into the recovery container 37 provided to the suction side of the vacuum pump 36.

In addition, a reaction solution is heated and maintained at a given temperature in the horizontal container 41. Thus, for instance, a jacket of a heat medium is provided at the outer periphery of the container 41 such that the reaction solution is heated by heat transfer through the container wall.

The mixer 45 is accommodated in the horizontal container 41. The mixer 45 comprises a plurality of stirring rods 46, which are arranged in parallel at given intervals along the axis in the horizontal container 41 and coupling rods 47 each coupling the end portions of neighboring stirring rods 46. The mixer 45 is formed by alternately coupling the stirring rods 46 and the coupling rods 47 in an orthogonal manner. Further, a rotation shaft 48 is coupled with a stirring rod 46, which is located at both ends of the mixer 45, at a point corresponding to the virtual rotation center of the mixer 45. Such a rotation shaft 48 is supported by a bearing provided to the horizontal container 41 and coupled with a drive shaft of a drive motor 49.

As described above, in the case of the mixer 45 in this Example, a coupling rod 47 is placed at a distance from the virtual rotation center of a stirring rod 46. Thus, when the mixer 45 rotates, the coupling rod 47 revolves around the virtual rotation center at a given circumferential speed. Accordingly, a polymerized product such as polylactide can be inhibited from being deposited on the coupling rod 47. Therefore, less-discolored, high-molecular-weight, and high-quality polylactide can be produced by inhibiting the thermal decomposition of a polymerized product.

In addition, the supply port 42 is positioned below a liquid level 38 of a reaction solution. Thus, when a reaction solution is supplied, the flow of the reaction solution within the horizontal container 41 is not disturbed and a plug flow is achieved, such that backflow can be prevented. Accordingly, an increase in residence time for a polymerized product can be suppressed. Therefore, less-discolored, high-molecular-weight, and high-quality polylactide can be produced by inhibiting the thermal decomposition of a polymerized product.

Meanwhile, during the operation of the degassing apparatus 8, the mixer 45 is actuated by the drive motor 49 such that polylactide in a molten state is stirred. In addition, the degassing bulb or valve 35 is opened and the vacuum pump 36 is operated such that a vacuum environment is provided in the horizontal container 41. Thus, unreacted lactide contained in polylactide is subjected to degassing. Further, unreacted lactide obtained by subjecting polylactide to degassing is transferred through the degassing port 44 to the recovery container 37. The recovery container 37 is cooled by a known cooling means such that cooled and solidified lactide in a powder form, for example, can be recovered therein. Further, when the recovery container 37 is replaced by, for example, a medium tank instead of using a cooling means, it is possible to precipitate and recover a volatile substance. Lactide recovered as above is sent to a production step by, for example, a certain transportation means (air transportation, etc.) so as to be recycled as a raw material. Waste gas from which lactide has been removed is emitted outside the system through the vacuum pump 36.

Polylactide refined by the degassing apparatus 8 is continuously discharged by the liquid feeding pump 15, while the bulb or valve 22 is opened. For the liquid feeding pump 15, a drawing screw, gear pump, or the like can be selected based on the viscosity of the reaction solution. The discharged polylactide is usually subjected to pelletization processing by water cooling and a chip cutter.

Each of the lactide supplying apparatus 1, the lactide melting apparatus 2, the catalyst supplying apparatus 3, the polymerization initiator supplying apparatus 4, the lactide supplying apparatus 5, the horizontal reaction tank 6, the vertical reaction tank 7, and the degassing apparatus 8 is provided with a nitrogen gas supplying pipe and a discharge pipe for purging the interior of such an apparatus or tank. This allows the reaction solution to be prevented from being scorched due to the presence of oxygen. It is desirable that the operation in the process be essentially initiated after all apparatuses in the process have been purged with nitrogen. Furthermore, the lactide supplying apparatus 1, the lactide melting apparatus 2, the catalyst supplying apparatus 3, the polymerization initiator supplying apparatus 4, the lactide supplying apparatus 5, the horizontal reaction tank 6, and the vertical reaction tank 7 are operated at approximately atmospheric pressure. This is intended to alleviate the volatilization of molten lactide.

As described above, in this Example, when removing an unreacted monomer contained in a polymer such as polylactide produced by a ring-opening polymerization reaction, it is possible to inhibit yellowing of such a polymer. In addition, when removing a medium contained in a polymer that is a polymer produced by another polymerization reaction, such as a polymer produced by polymerization in solvents, it is possible to inhibit yellowing of such a polymer.

All publications, patents, and patent applications cited herein are incorporated herein by reference in their entirety.

What is claimed is:

1. A polymer producing method comprising stirring polyhydroxycarboxylic acid in a molten state obtained by subjecting a cyclic dimer of hydroxycarboxylic acid to a ring opening polymerization reaction and removing by degassing an unreacted cyclic dimer residue at a pressure lower than that for the ring opening polymerization reaction, wherein the ring opening polymerization reaction is continuously carried out using a plurality of polymerization tanks connected in series, provided that a horizontal polymerization tank, which comprises a horizontal reaction tank accommodating a stirring body having a stirring shaft located horizontally with respect to the ground, a supply port that is formed at one end side of the horizontal reaction tank for supplying a reactant, a discharge port that is formed at the other end side of the horizontal reaction tank for discharging the reactant, and at least one weir placed in the horizontal reaction tank, is placed in the first stage, and that a vertical polymerization tank, which comprises a vertical reaction tank accommodating a stirring shaft located vertically with respect to the ground, a supply port that is formed at the upper end side of the vertical reaction tank for supplying a reactant, and a discharge port that is formed at the lower end side of the vertical reaction tank for discharging the reactant, is placed in the final stage; and wherein the removal by degassing is continuously carried out by supplying a treated substance obtained by the ring opening polymerization reaction via the supply port located at the one end side of the horizontal tank, allowing the stirring body, which comprises a plurality of rectangular stick frames coupled to oriente longitudinally with respect to the tank and does not have a stirring shaft inserted through the virtual rotation center, to rotate circumferentially within the tank, discharging the treated substance from the discharge port located at the other end side, and discharging a degassed gas via a degassing port located above the molten liquid level of the treated substance.

2. The polymer producing method according to claim 1, comprising adding at least one of an agent capable of deactivating a catalyst for a ring opening polymerization reaction and an agent capable of reducing thermal degradation of the treated substance to the treated substance obtained by the ring opening polymerization reaction before carrying out the removal by degassing.

3. The polymer producing method according to claim 1, comprising recovering the degassed gas discharged from the degassing port by condensation or solidification, subjecting the recovered substance to the ring opening polymerization reaction step or a step prior to the step, and recycling it.

4. A polymer producing apparatus for stirring polyhydroxycarboxylic acid in a molten state obtained by subjecting a cyclic dimer of hydroxycarboxylic acid to a ring opening polymerization reaction and removing by degassing a unreacted cyclic dimer residue at a pressure lower than that for the ring opening polymerization reaction, wherein an apparatus for carrying out the ring opening polymerization reaction is composed of a plurality of polymerization tanks connected in series, provided that a horizontal polymerization tank, which comprises a horizontal reaction tank accommodating a stirring body having a stirring shaft located horizontally with respect to the ground, a supply port that is formed at one end side of the horizontal reaction tank for supplying a reactant, a discharge port that is formed at the other end side of the horizontal reaction tank for discharging the reactant, and at least one weir placed in the horizontal reaction tank, is placed in the first stage, and that a vertical polymerization tank, which comprises a vertical reaction tank accommodating a stirring shaft located vertically with respect to the ground, a supply port that is formed at the upper end side of the vertical reaction tank for supplying a reactant, and a discharge port that is formed at the lower end side of the vertical reaction tank for discharging the reactant, is placed in the final stage; and wherein an apparatus for carrying out the removal by degassing is composed of a horizontal stirring tank, a stirring body that is accommodated in the stirring tank and is supported such that it is able to rotate circumferentially within the tank, a supply port that is formed at one end of the stirring tank for supplying a treated substance obtained by the ring opening polymerization reaction, a discharge port that is formed at the other end thereof for discharging the treated substance, a degassing port that is formed above the molten liquid level of the treated substance in the stirring tank for discharging a degassed gas, a recovery container that is connected to the degassing port for recovering a degassed gas by condensation or solidification, and a vacuum pump that is connected to the recovery container for vacuuming the inside of the tank, provided that the stirring body is formed by coupling a plurality of rectangular stick frames oriented longitudinally with respect to the tank and does not have a stirring shaft that is inserted through the virtual rotation center.

5. The polymer producing apparatus according to claim 4, wherein the supply port and the discharge port formed in the stirring tank are positioned below the molten liquid level of the treated substance.

6. The polymer producing apparatus according to claim 4, comprising a means for adding at least one of an agent capable of deactivating a catalyst for a ring opening polymerization reaction and an agent capable of reducing thermal degradation of the treated substance to the treated substance obtained by the ring opening polymerization reaction before carrying out the removal by degassing.

7. The polymer producing apparatus according to claim 4, comprising a means for subjecting a substance recovered into the recovery container to the ring opening polymerization reaction step in the plurality of polymerization tanks or a step prior to the step.

8. The polymer producing apparatus according to claim 6, comprising a means for subjecting a substance recovered into the recovery container to the ring opening polymerization reaction step in the plurality of polymerization tanks or a step prior to the step.

* * * * *